(12) United States Patent
Handa (10) Patent No.: US 7,250,964 B2
(45) Date of Patent: Jul. 31, 2007

(54) DATA TRANSMITTING APPARATUS

(75) Inventor: Yasushi Handa, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 890 days.

(21) Appl. No.: 10/649,743

(22) Filed: Aug. 28, 2003

(65) Prior Publication Data

US 2004/0041908 A1 Mar. 4, 2004

(30) Foreign Application Priority Data

Aug. 29, 2002 (JP) ............................. 2002-251881

(51) Int. Cl.
*H04N 7/18* (2006.01)
*H04N 9/47* (2006.01)

(52) U.S. Cl. ..................................... 348/143
(58) Field of Classification Search ................ 348/143; 725/95

See application file for complete search history.

(56) References Cited

U.S. PATENT DOCUMENTS 6,323,897 B1 * 11/2001 Kogane et al. ............. 348/159

* cited by examiner

*Primary Examiner*—Gims Philippe
*Assistant Examiner*—Erick Rekstad
(74) *Attorney, Agent, or Firm*—Westerman, Hattori, Daniels & Adrian, LLP.

(57) ABSTRACT

A data transmitting apparatus includes a sensor. When an alarm is generated from the sensor, a post-alarm recording is started, and a plurality of still image files are written to an alarm storage area of an SDRAM by a memory control circuit. The still image files within the alarm storage area are transmitted to an image accumulating server through an NIC during a period from occurrence of the alarm to becoming full of the alarm storage area. Furthermore, still image files created in a normal recording after the post-alarm recording are intermittently transmitted to the image accumulating server at an arbitrary file transmission cycle. The still image files which have not been transmitted yet out of the still image files in the alarm storage area are transmitted to the image accumulating server at intervals of the file transmission operations in the normal recording mode.

7 Claims, 11 Drawing Sheets

(A) NORMAL RECORDING (B) POST-ALARM RECORDING (C) ADDITIONAL ALARM RECORDING

(A) NORMAL RECORDING (B) POST-ALARM RECORDING (C) ADDITIONAL ALARM RECORDING

DATA TRANSMITTING APPARATUS

BACKGROUND OF THE INVENTION

1. Field of the Invention

The present invention relates to a data transmitting apparatus which is applied to a video camera, for example. More specifically, the present invention relates to a data transmitting apparatus which transmits to an image management apparatus still image data of each object periodically photographed by an imager through a communication network.

2. Description of the Prior Art

In such a kind of video camera, image data of a photographed object is transmitted to an image management apparatus through a communication network such as the Internet. However, in a case of transmitting the image data through the communication network, a transmission speed of the image data depends on traffic of the communication network, and therefore, there is a case of causing a so-called frame lacking on the image data to be transmitted. Such a problem is conspicuous when the prior art is applied to a surveillance camera system and a frame rate of the photographed image data to be transmitted is heightened in response to occurrence of an alarm (e.g., 3 fps→30 fps). That is, the higher importance the photographed image data has, the higher a possibility of the frame lacking becomes, and therefore, a part of the image data obtained after the occurrence of the alarm may be lacked. On the other hand, in the surveillance camera system, reproducing in real-time the photographed image data is not required so much.

SUMMARY OF THE INVENTION

Therefore, a primary object of the present invention is to provide a data transmitting apparatus capable of surely transmitting to an image management apparatus image data of high importance.

According to the present invention, a data transmitting apparatus which transmits still image data of an object repeatedly photographed by an imager to an image management apparatus through a communication network comprises: a first writer for writing a plurality of screens of the still image data to a first memory area when an alarm occurs; a first transmitter for transmitting the still image data stored in the first memory area to the image management apparatus during a first period which is a period from occurrence of the alarm to completion of writing of the plurality of screens of the still image data; a second transmitter for transmitting to the image management apparatus still image data obtained during a second period different from the first period at an arbitrary cycle; and a third transmitter for transmitting the still image data which has not been transmitted yet by the first transmitter to the image management apparatus at intervals of transmission operations by the second transmitter.

The still image data of the object repeatedly photographed by the imager is transmitted to the image management apparatus through the communication network. When the alarm occurs, the plurality of screens of the still image data is written to the alarm image memory area by the alarm image writer. The still image data stored in the alarm image memory area are transmitted to the image management apparatus by the first transmitter during a first period which is a period from the occurrence of the alarm to the completion of writing the plurality of screens of the still image data. Furthermore, the still image data obtained during the second period different from the first period is transmitted by the second transmitter to the image management apparatus at the arbitrary cycle. The still image data which has not been transmitted yet by the first transmitter out of the still image data stored in the alarm image memory area is transmitted to the image management apparatus by the third transmitter at intervals of the transmission operations by the second transmitter.

That is, the still image data stored in the alarm image memory area is transmitted by the first transmitter during the first period and transmitted by the third transmitter during the second period. Thus, all still image data stored in the alarm image memory area is surely managed by the image management apparatus.

If photographed time information is assigned to the still image data prior to transmitting to the image management apparatus, even if a photographed order of the objects and a transmitting order of still image data do not accord with each other, the image management apparatus can adequately mange the still image data.

In a case the still image data is written in a second memory area, the second transmitter transmits the still image data stored in the second memory area at an arbitrary cycle.

It is adequate that the still image data stored in the second memory area is transmitted to the image management apparatus at a predetermined target cycle during a third period sandwiched between the first period and the second period.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
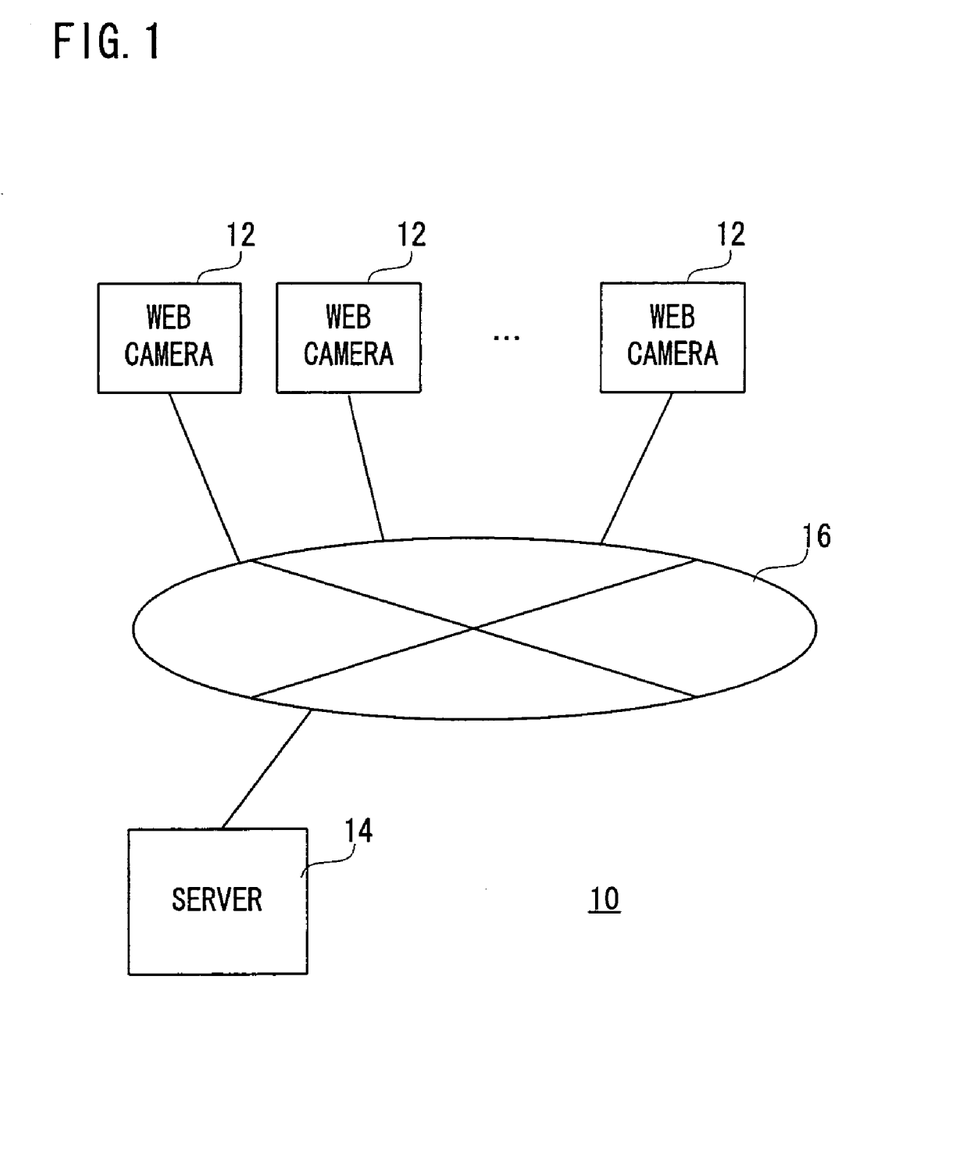
FIG. 1 is a block diagram showing one embodiment of the present invention.

Referring to FIG. 1, a surveillance camera system 10 of the embodiment is formed by a plurality of WEB cameras (video cameras) 12, 12, . . . and an image accumulating server 14. The WEB cameras 12, 12, . . . and the image accumulating server 14 are connected with each other via the Internet 16.

Figure 2:
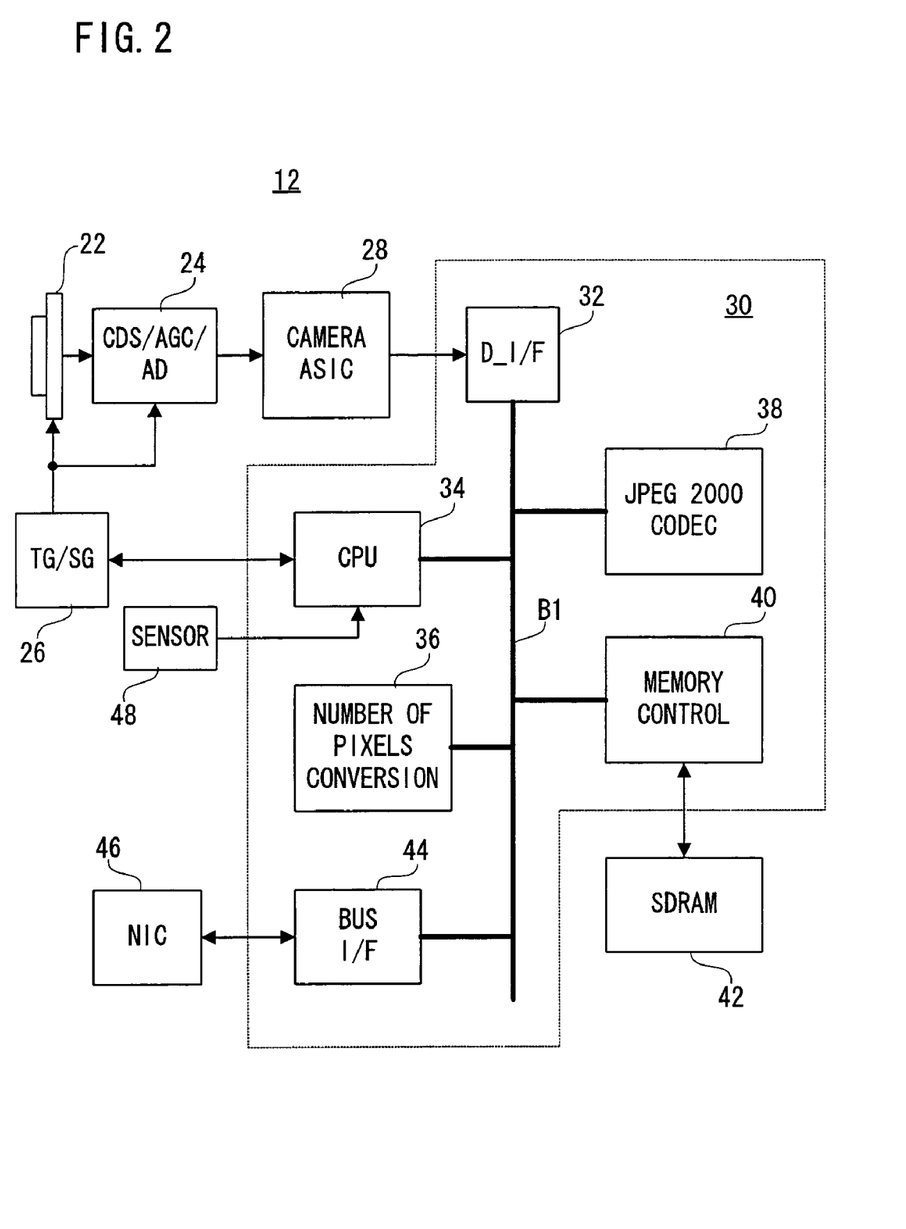
FIG. 2 is a clock diagram showing one example of a configuration of a WEB camera applied to FIG. 1 embodiment.

The WEB camera 12 is specifically constructed as shown in FIG. 2. When an optical image of an object is incident upon a light-receiving surface of an image sensor 22, an electric charge corresponding to the optical image, i.e., a raw image signal is generated by a photoelectronic conversion. The generated raw image signal is read from the image sensor 12 in response to a timing pulse output from a TG/SG 26. A user can set a field mode or a frame mode as a reading mode of the image sensor 12. When the field mode is selected, the image sensor 12 is scanned by an interlace scan manner and a raw image signal of 720 pixels in a horizontal direction×240 lines in a vertical direction is read from the image sensor 12 in the rate of 30 frames to 1 second.

The raw image signal read from the image sensor 12 is applied to a CDS/AGC/AD circuit 24 so as to be subjected to a series of processing such as correlated double sampling, automatic gain adjustment and A/D conversion. Thus, raw image data being a digital signal is generated. The raw image data is subjected to a signal processing such as color separation, white balance adjustment, YUV conversion and etc. in an ASIC 28 for camera process. Image data of YUV format is output from the ASIC 28. The output image data is applied to a memory control circuit 40 through a D_I/F 32 included in an ASIC 30 for transfer processing and a bus B1 and written to an SDRAM 42 by the memory control circuit 40.

Figure 3:
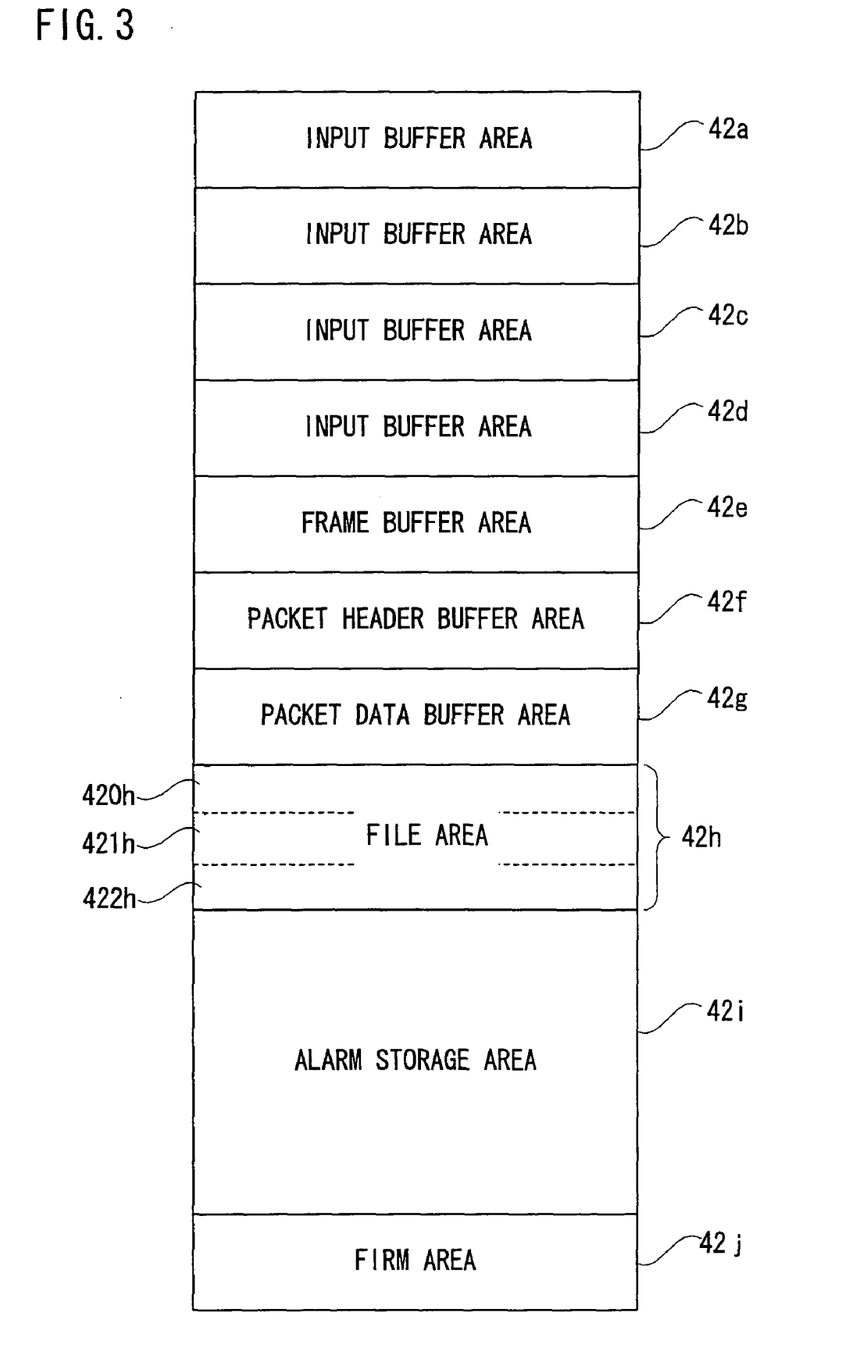
FIG. 3 is an illustrative view showing one example of a mapping state of an SDRAM applied to FIG. 2 embodiment.

Referring to FIG. 3, the SDRAM 42 is formed with input buffer areas 42a-42d, a frame buffer area 42e, a packet header area 42f, a packet data buffer area 42g, a file area 42h, an alarm storage area 42i and a firm area 42j.

In a case the field mode is selected, the memory control circuit 40 fetches from the D_I/F 32 image data of 720 pixels×240 lines corresponding to an odd field and writes 1 field of the fetched image data to any one of the input buffer areas 42a-42d. On the other hand, in a case the frame mode is selected, the memory control circuit 40 fetches from the D_I/F 32 image data of 720 pixels×480 lines at every 1 frame and writes 1 frame of the fetched image data to any one of the input buffer areas 42a-42d.

In both of the filed mode and the frame mode, the image data is fetched from the D_I/F 32 every 1/30 seconds. On the other hand, a writing destination of the image data is circularly renewed every 1/30 seconds among the input buffer areas 42a-42d. Accordingly, the fetched 1 field or 1 frame of image data is written to the input buffer area 42a, the input buffer area 42b, the input buffer area 42c, the input buffer area 42d and the input buffer area 24a . . . in this order.

The image data written to the input buffer areas 42a-42d is circularly read every 1/30 seconds by the memory control circuit 40 and applied to a number of pixels conversion circuit 36. The number of pixels conversion circuit 36 converts a resolution of the applied image data to a resolution set by the user. As to the field mode, it is possible to select a desired resolution from among "720 pixels×240 lines", "320 pixels×240 lines" and "160 pixels×120 lines". Furthermore, as to the frame mode, it is possible to select the desired resolution from "720 pixels×480 lines" and "640 pixels×480 lines". The image data of selected resolution is output from the number of pixels conversion circuit 36 every 1/30 seconds.

It is noted that when the "720 pixels×240 lines" is selected in the field mode, or when the "720 pixels×480 lines" is selected in the frame mode, the number of pixels conversion circuit 36 outputs the applied image data as it is. Furthermore, the resolution can be individually selected from a normal recording mode and an alarm recording mode (post-alarm recording mode and additional alarm recording mode) described later.

The memory control circuit 40 temporality writes the image data output from the number of pixels conversion circuit 36 to the frame buffer area 42e shown in FIG. 3 and then output it to a JPEG 2000 codec 38. The JPEG 2000 codec 38 compresses the applied image data by a JPEG 2000 format and returns JPEG data thus generated to the memory control circuit 40. The JPEG data is written to the packet data buffer area 42g shown in FIG. 3 by the memory control circuit 40.

On the other hand, the CPU 34 detects a photographed time of the object corresponding to the JPEG data and applies photographed time information indicative of the detected photographed time to the memory control circuit 40. The photographed time information is written to the packet header buffer area 42f shown in FIG. 3 by the memory control circuit 40.

Thus, in both of the field mode and the frame mode, 1 screen of the JPEG data and the photographed time information corresponding thereto are created every 1/30 seconds. The JPEG data is stored in the packet data buffer area 42g, and the photographed time information is stored in the packet header buffer area 42f.

As the recording mode, there are 3 modes of the normal recording mode, the post-alarm recording mode and the additional alarm recording mode. When no alarm is generated from a sensor 48 shown in FIG. 2, a normal recording is executed. When an alarm is generated from the sensor 48, a post-alarm recording and an additional alarm recording are executed, and after completion of the additional alarm recording, it is returned to the normal recording. It is noted that in this embodiment, a period during which the normal recording is performed is defined as a "normal recording period", a period during which a post-alarm recording is performed is defined as a "post-alarm recording period", and a period during which an additional alarm recording is performed is defined as an "additional alarm recording period".

In any recording modes, the CPU 34 reads the photographed time information and JPEG data related with each other from the packet header buffer 42f and the packet data buffer area 42g and creates a still image file including the 1 screen of photographed time information and the JPEG data read. Which area of the SDRAM 42 the still image file is created in depends on the recording mode.

It is noted that reading of the photographed time information and JPEG data and writing of the still image file are performed through the memory control circuit 40. Furthermore, a size of the created still image file is varied depending upon a resolution of the image data and a compression ratio of the JPEG 2000 codec.

The still image file stored in the SDRM 42 is read by the memory control circuit 40 and applied to an NIC (Network Interface Card) 46 through a bus I/F 44. The NIC 46 is connected to the Internet 16, and the still image file applied to the NIC 46 is transmitted to the image accumulating server 14 through the Internet 16. It is noted that a transmission cycle of the still image file depends on the recording mode and traffic of the Internet 16.

In the normal recording mode, the still image file is stored in the file area 42*h* shown in FIG. 3. The file area 42*h* has 3 divided areas 420*h*-422*h* each of which can store image data of 720 pixels×480 lines in a uncompressed manner. The still image file created every 1/30 seconds in the normal recording mode is circularly written to the divided areas 420*h*-422*h* in a manner shown in FIG. 4(A). In the normal recording mode, the file transmission cycle can be arbitrarily set in the "1/30 seconds" to "10 seconds" range. Therefore, the still image file is read from the file area 42*h* at the set file transmission cycle and transmitted to the image accumulating server 14.

When the alarm occurs from the sensor 48, the recording mode is shifted from the normal recording mode to the post-alarm recording mode. In the post-alarm recording mode, the still image file is stored in the alarm storage area 42*i* shown in FIG. 3. The writing of the still image file is completed at a time the alarm storage area 42*i* becomes full. That is, the still image file created every 1/30 seconds is written to the alarm storage area 42*i* in a manner shown in FIG. 4(B), and at a time the alarm storage area 42*i* becomes full, the writing is completed. In the post-alarm recording mode, the file transmission cycle is set to 1/30 seconds. Therefore, the still image file is read from the alarm storage area 42*i* at a cycle aimed for 1/30 seconds and transmitted to the image accumulating server 14.

Figure 4:
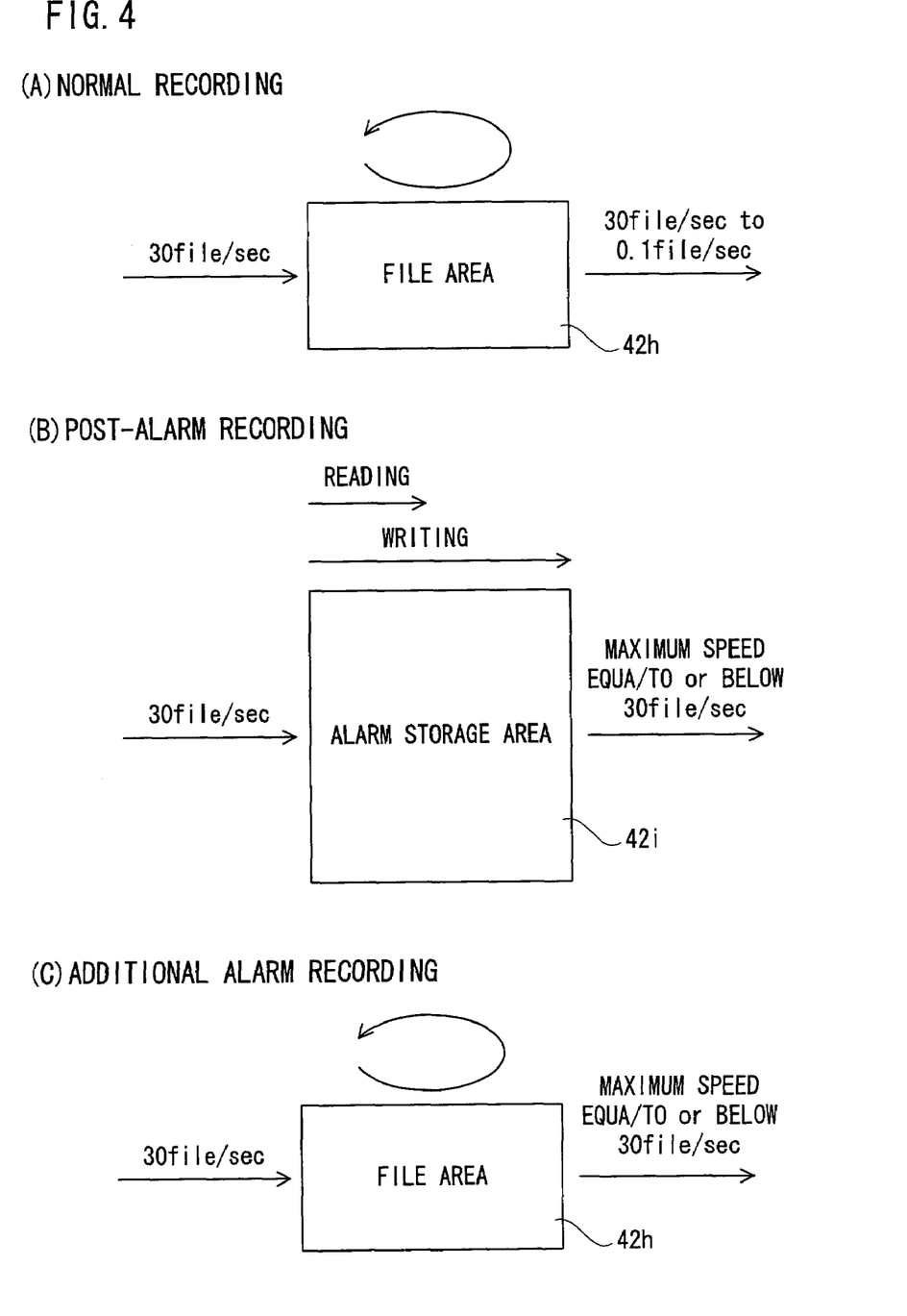
FIG. 4(A) is an illustrative view showing a part of an operation of FIG. 2 embodiment in a normal recording mode.
FIG. 4(B) is an illustrative view showing a part of the operation of FIG. 2 embodiment in a post-alarm recording mode.
FIG. 4(C) is an illustrative view showing a part of the operation of FIG. 2 embodiment in an additional alarm recording mode.

At a time the alarm storage area 42*i* becomes full, the alarm recording period expires, and the recording mode is shifted from the post-alarm recording mode to the additional alarm recording mode. In the additional alarm recording mode, the still image file is stored in the file area 42*h*. Each of the still image files is circularly written to the divided areas 420*h*-422*h* similarly to the normal recording mode while the file transmission cycle in the additional recording mode is set to 1/30 seconds. Therefore, as shown in FIG. 4(C), the still image file is read from the file area 42*h* at a cycle aimed for 1/30 seconds and transmitted to the image accumulating server 14. It is noted that the additional alarm recording period is arbitrarily set by the user in the "1 second" to "30 seconds" range, and after a lapse of a setting period, it is restored to the normal recording mode.

In the normal recording or the additional alarm recording, the still image file is written to the file area 42*h* every 1/30 seconds and therefore, if the file transmission cycle is longer than 1/30 seconds, the still image file which has not been transmitted yet is overwritten by a following still image file. Consequently, a frame lacking occurs on the transmitted still image file. The problem of the frame lacking occurs when the file transmission cycle in the normal recording is set to a cycle longer than 1/30 seconds as well as when it takes longer time than 1/30 seconds for transmitting 1 still image file due to heavy traffic jam of the Internet 16.

On the other hand, the post-alarm recording is completed at a time the alarm storage area 42*i* becomes full, and the still image file which has not been transmitted yet is not overwritten by the following still image file. Therefore, even if it takes more time than expected for transmitting each of the still image files, the frame lacking never occurs to the still image file. It is noted that when it takes for transmitting more time than expected, the post-alarm recording is completed in a state the still image file which has not been transmitted yet remains in the alarm storage area 42*i*. The still image file which has not been transmitted yet is, when it is restored to the normal recording mode through the additional alarm recording mode, transmitted to the image accumulating server 14 during intervals between the file transmission operations.

Figure 5:
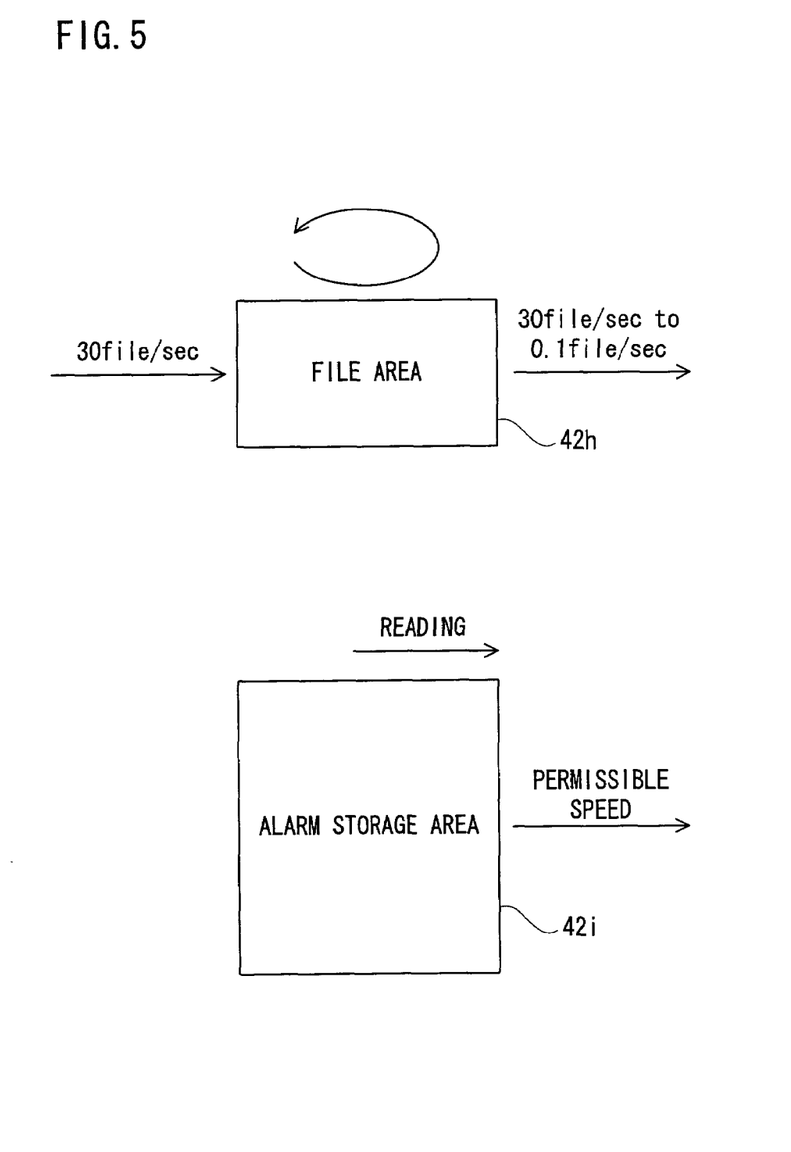
FIG. 5 is an illustrative view showing another part of the operation of FIG. 2 embodiment in the normal recording mode.

That is, as can be understood from FIG. 5, the still image file stored in the file area 42*h* by the normal recording is transmitted to the image accumulating server 14 at an arbitrary file transmission cycle, and the still image file which has not been transmitted yet in the alarm storage area 42*i* is transmitted to the image accumulating server 14 at intervals between the file transmission operations.

Thus, as to the still image file created in the normal recording mode or the additional alarm recording mode, there is a possibility that a transmission partially fails due to the file transmission cycle or the traffic of the Internet 16. However, as to the still image file created in the post-alarm recording mode, i.e., the still image file of high importance, it is possible to be surely transmitted to the image accumulating server 14 irrespective of the traffic of the Internet 16.

It is noted that the still image file is imbedded with the photographed time information and therefore, even if a transmitting order and a creating order of the still image file do not accord with each other, the image accumulating server 14 can manage each of the still image files in the creating order, i.e., photographed order.

Figure 6:
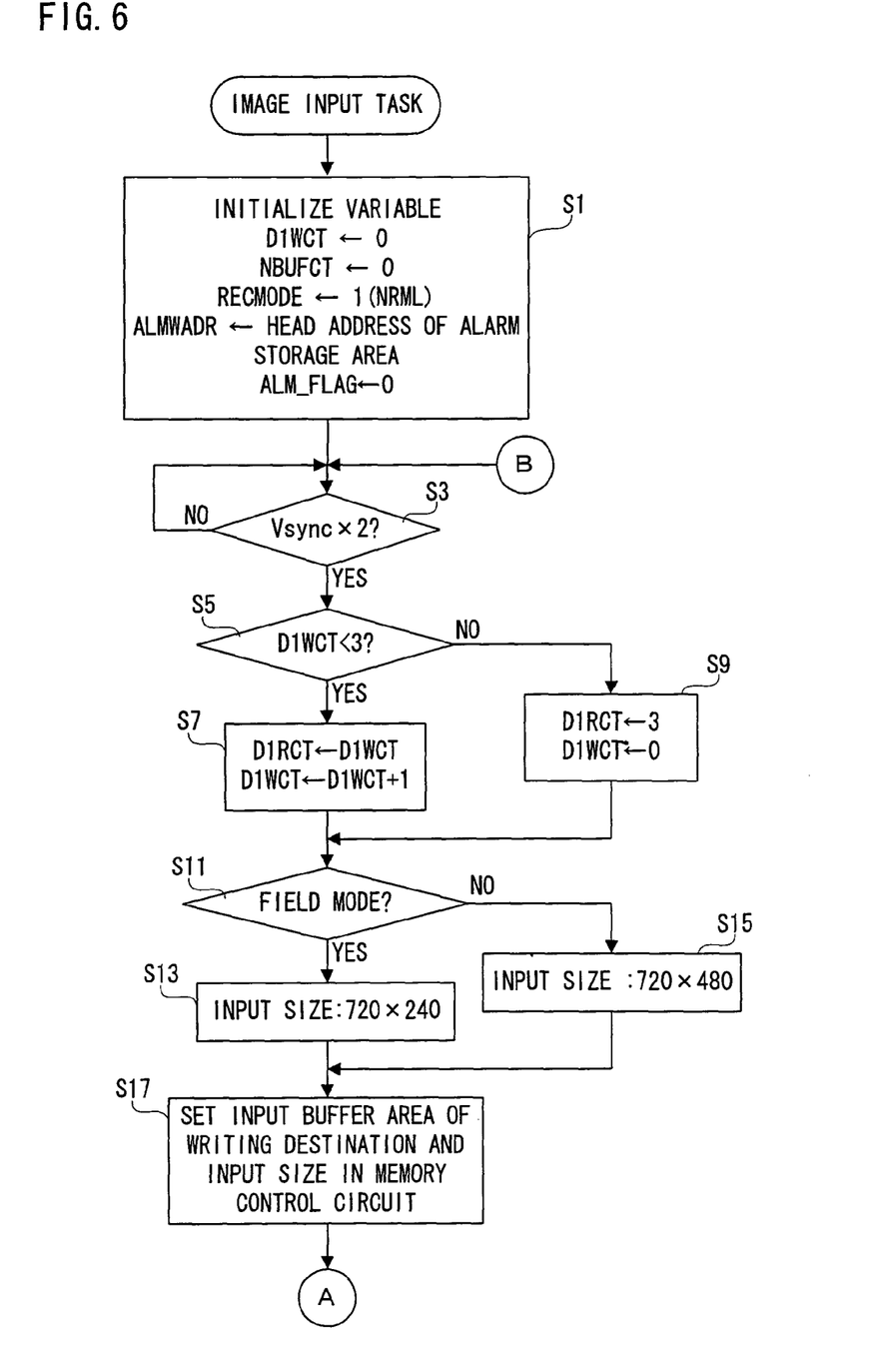
FIG. 6 is a flowchart showing a part of the operation of FIG. 2 embodiment.
Figure 7:
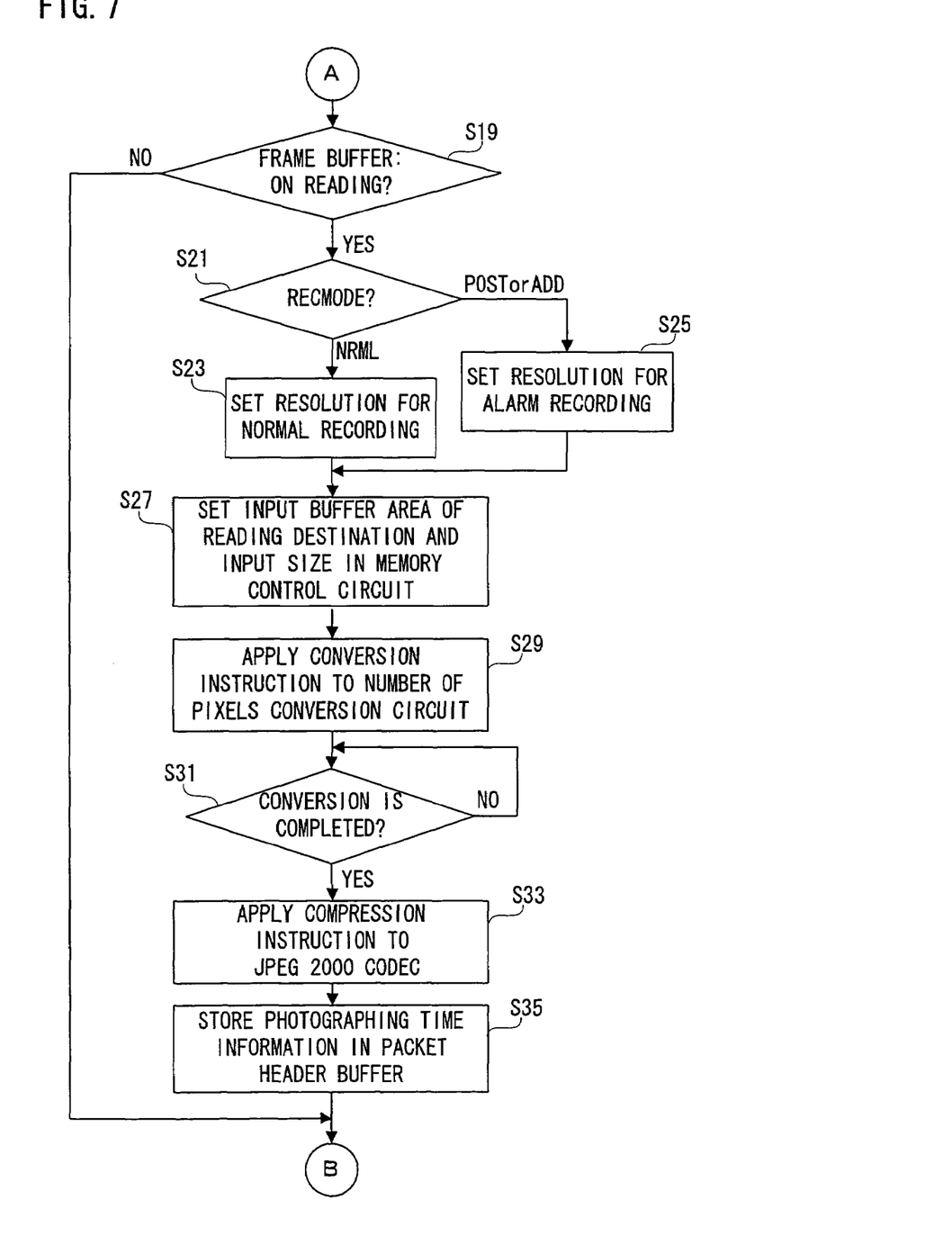
FIG. 7 is a flowchart showing another part of the operation of FIG. 2 embodiment.
Figure 8:
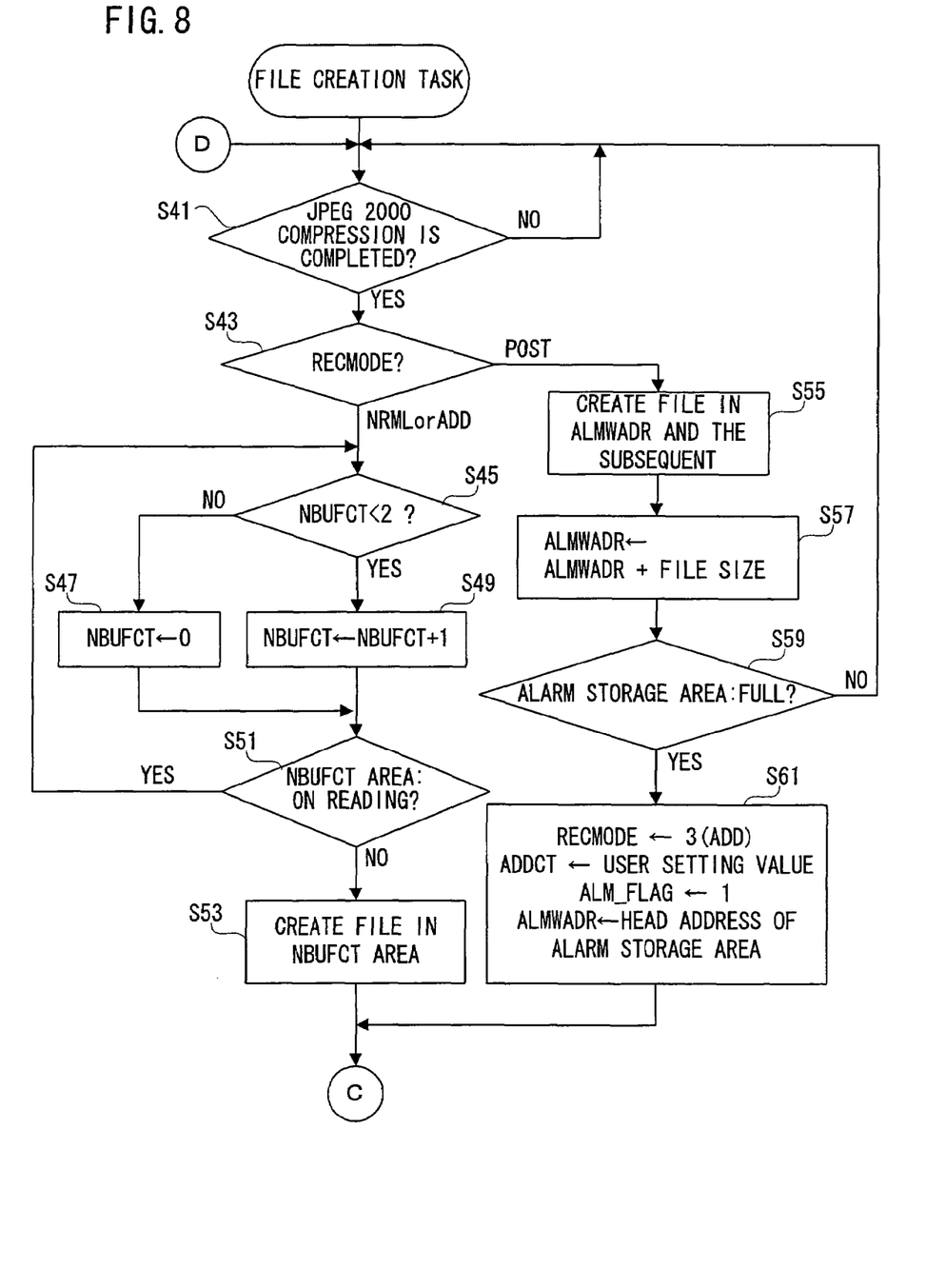
FIG. 8 is a flowchart showing the other part of the operation of FIG. 2 embodiment.
Figure 9:
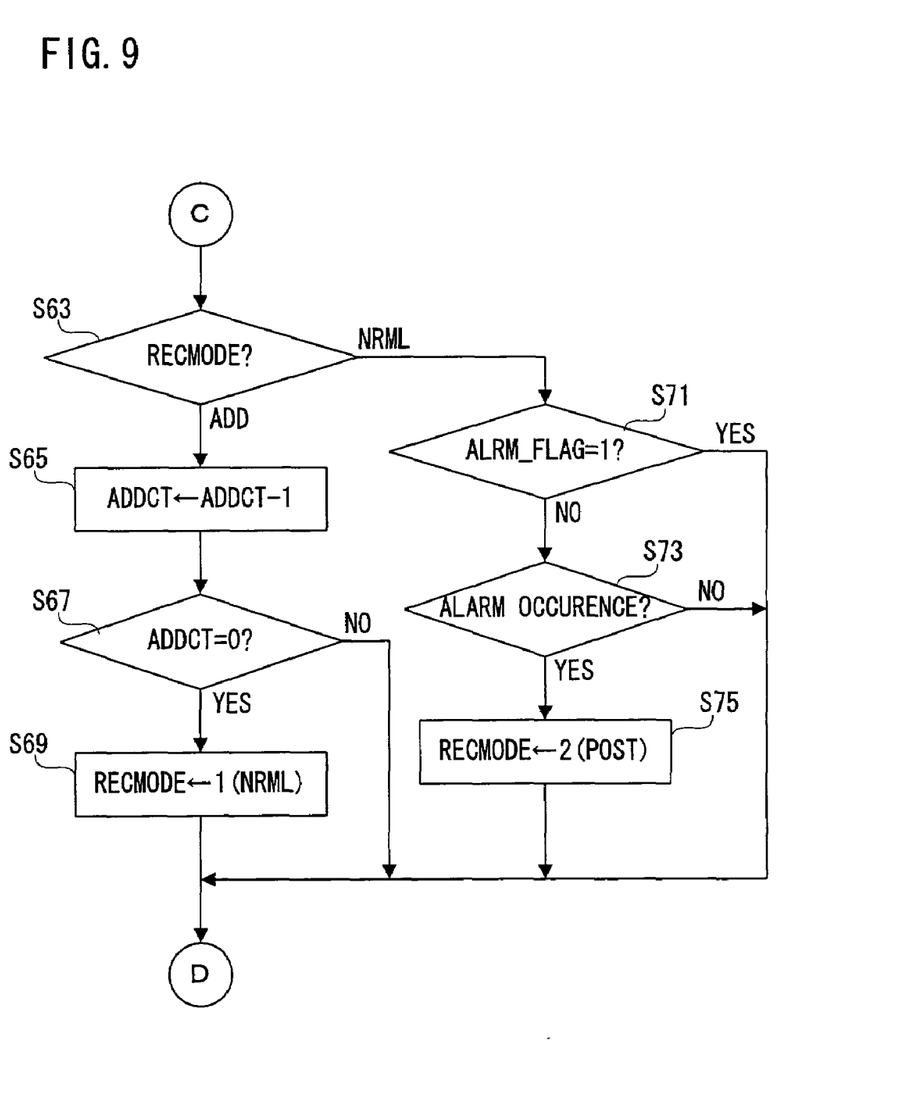
FIG. 9 is a flowchart showing a further part of the operation of FIG. 2 embodiment.
Figure 10:
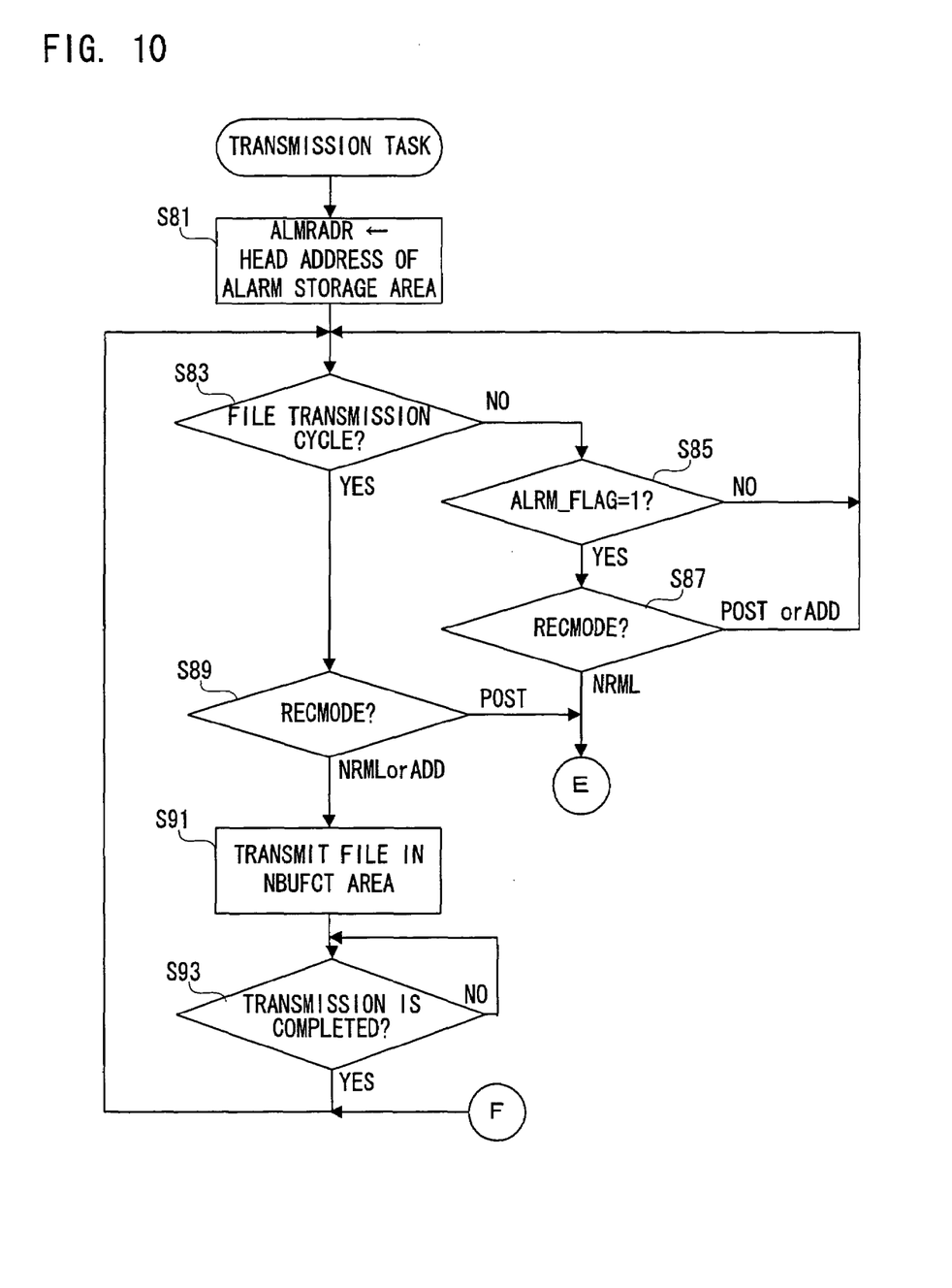
FIG. 10 is a flowchart showing another part of the operation of FIG. 2 embodiment.
Figure 11:
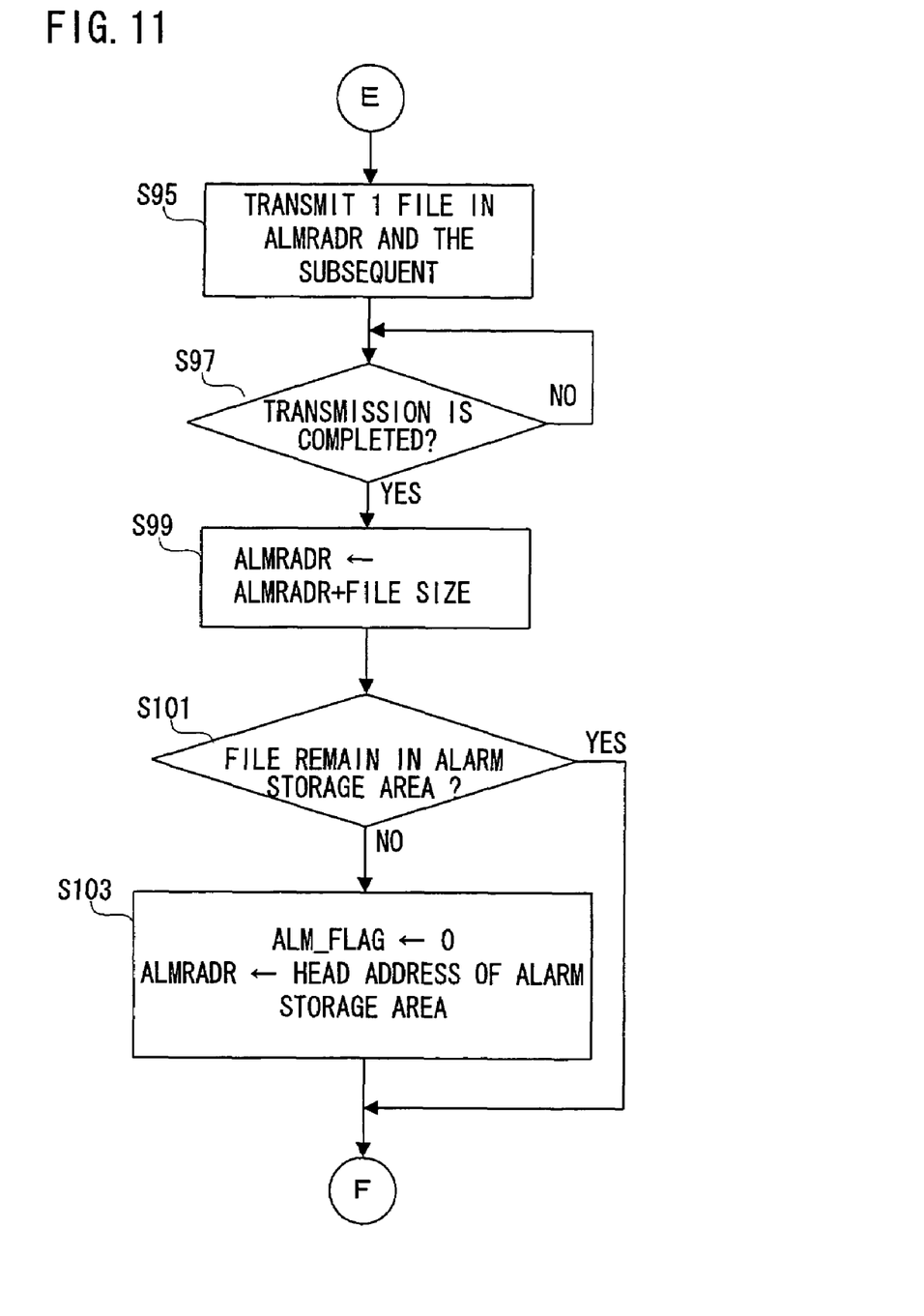
FIG. 11 is a flowchart showing the other part of the operation of FIG. 2 embodiment.

The CPU 34 specifically executes a process according to flowcharts shown in FIG. 6 to FIG. 11. Out of these, the flowcharts shown in FIG. 6 and FIG. 7 show an image input task, FIG. 8 and FIG. 9 show a file creating task, and FIG. 10 and FIG. 11 show a transmitting task. It is noted that control programs corresponding to these flowcharts are stored in the firm area 42*j* of the SDRAM 42.

First, referring to FIG. 6 and FIG. 7, a various kinds of variables are initialized in a step S1. More specifically, a variable D1WCT is set to "0", a variable NBUFCT is set to "0", and a variable RECMODE is set to "1". Furthermore, a variable ALMWDR is set to a head address of the alarm storage area 42*i*, and a variable ALM_FLAG is set to "0".

The variable D1WCT is a variable for designating a writing destination of the image data input from the D_I/F32 and circuraly renewed among "0" to "3". If D1WCT=0, the input buffer area 42*a* is designated, if D1WCT=1, the input buffer area 42*b* is designated, if D1WCT=2, the input buffer area 42*c* is designated, and if D1WCT=3, the input buffer area 42*d* is designated.

The variable NBUFCT is a variable for determining to which area among the divided areas 420*h*-422*h* the still image file is to be written and from which area among the divided areas 420*h*-422*h* the still image file is to be read, and circuraly renewed among "0" to "2". If NBUFCT=0, the divided area 420*h* is designated, if NBUFCT=1, the divided area 421*h* is designated, and if NBUFCT=0, the divided area 422*h* is designated.

The variable RECMODE is a variable for specifying the recording mode and indicates any one of "1" to "3". RECMODE=1 indicates the normal recording, RECMODE=2 indicates post-alarm recording, and RECMODE=3 indicates the additional alarm recording.

The variable ALMWDR is a variable indicative of a writing start address of the still image file created during the post-alarm recording period. The variable ALM_FLAG is a variable for identifying a storing state of the alarm storage area 42*i*. If the alarm storage area 42*i* is empty, the variable ALM_FLAG indicates "0", and if the alarm storage area 42*i* is full, the variable ALM_FLAG indicates "1".

It is determined whether or not a vertical synchronization signal is applied twice from the TG/SG 26 in a step S3. In a case any of the filed mode or the frame mode is selected, the vertical synchronization signal is output from the TG/SG 26 every 1/60 seconds. Accordingly, "YES" is determined every 1/30 seconds in the step S3.

A value of the variable D1WCT is determined in a step S5. If the variable D1WCT is less than "3", the process proceeds from the step S5 to a step S7 so as to set a current numerical value of the variable D1WCT to a variable D1RCT and increment the variable D1WCT. On the other hand, if the variable D1WCT is "3", the process proceeds from the step S5 to a step S9 so as to set the variable D1RCT to "3" and the variable D1WCT to "0". After completion of the step S7 or the step S9, the process proceeds to a step S11.

It is noted that the variable D1RCT is a variable for designating a reading destination of the image data and circuraly renewed among "0" to "3". As described above, if D1RCT=0, the input buffer area 42*a* is designated, if D1RCT=1, the input buffer area 42*b* is designated, if D1RCT=2, the input buffer area 42*c* is designated, and if D1RCT=3, the input buffer area 42*d* is designated.

A currently selected reading mode of the image sensor 22 is identified in the step S11. If the reading mode is the field mode, an input size is determined to be "720 pixels×240 lines" in a step S13. On the other hand, if the reading mode is the frame mode, the input size is determined to be "720 pixels×480 lines" in a step S15. The variable D1WCT renewed in the step S7 or step S9 and the input size determined in the step S13 or the step S15 are set in the memory control circuit 42 in a step S17.

The memory control circuit 42 fetches from the D_I/F 32 the image data corresponding to the set input size and writes the fetched image data to the input buffer area corresponding to the variable D1WCT. For example, if the field mode is selected and the variable D1WCT indicates "0", the image data of 720 pixels×240 lines, i.e., 1 field is written to the input buffer area 42*a* shown in FIG. 3. Furthermore, if the frame mode is selected and the variable D1WCT indicates "2", the image data of 720 pixels×480 lines, i.e., 1 frame is written to the input buffer area 42*c* shown in FIG. 3.

It is determined whether or not the frame buffer 42*e* shown in FIG. 3 is being subjected to reading in a step S19. If "NO" herein, the process is returned to the step S3 through processes in steps S21 to S35 while if "YES", the process directly returns to the step S3.

The variable RECMODE is identified in the step S21. If the variable RECMODE is "1", the resolution for normal recording is set to the number of pixels conversion circuit 36 in the step S23, and if the variable RECMODE is "2" or "3", the resolution for alarm recording is set to the number of pixels conversion circuit 36 in the step S25.

As described above, as to the field mode, both of the resolutions for normal recording and alarm recording can be selected from among "720 pixels×240 lines", "320 pixels×240 lines" and "160 pixels×120 lines". Furthermore, as to the frame mode, both of the resolutions for normal recording and alarm recording can be selected from "720 pixels×480 lines" and "640 pixels×480 lines". The resolution selected for normal recording is set in the number of pixels conversion circuit 36 in the step S23, and the resolution selected for alarm recording is set in the number of pixels conversion circuit 36 in the step S25.

In the step S27, the variable D1RCT renewed in the step S7 or step S9 and the input size determined in the step S13 or S15 are set in the memory control circuit 42. In a succeeding step S29, a conversion instruction including the selected resolution is applied to the number of pixels conversion circuit 36.

The memory control circuit 42 reads the image data corresponding to the set input size from the input buffer area corresponding to the variable D1RCT. For example, if the field mode is selected and the variable D1RCT indicates "1", the image data of 720 pixels×240 lines, i.e., 1 field is read from the input buffer area 42*b* shown in FIG. 3. Furthermore, if the frame mode is selected and the variable D1RCT indicates "3", the image data of 720 pixels×480 lines, i.e., 1 frame is read from the input buffer area 42*d* shown in FIG. 3.

The read image data is applied to the number of pixels conversion circuit 36. The number of pixels conversion circuit 36 performs a number of pixels conversion process on the image data on the basis of the resolution set in the step S23 or the step S25. Thus, the image data of a desired resolution is output from the number of pixels conversion circuit 36. For example, if the field mode is selected as a reading mode and the resolution of "320 pixels×240 lines" is selected as the resolution for normal recording, the image data of 320 pixels×240 lines is output from the number of pixels conversion circuit 36 in the normal recording mode. The output image data is written to the frame buffer area 42*e* shown in FIG. 3 by the memory control circuit 40.

It is determined whether or not the number of pixels conversion has been finished in the step S31. More specifically, it is determined whether or not writing of the converted image data to the frame buffer area 42*e* has been finished. If "YES" is determined in the step S31, a compression instruction is applied to the JPEG 2000 codec 38 in the step S33.

The JPEG 2000 codec 38 reads the image data from the frame buffer area 42*e* shown in FIG. 3 through the memory control circuit 40 and performs a compression process complying with the JPEG 2000 format on the read image data. The JPEG data thus generated is written to the packet data buffer area 42*g* shown in FIG. 3 by the memory control circuit 40.

A photographed time of the image data on which the compression process is performed is detected in the step S35, and the photographed time information indicative of the photographed time is written to the packet header buffer area 42*f* through the memory control circuit 40. After completion of the process in the step S35, the process is returned to the step S3.

Thus, in the image input task, 1 field or 1 frame of the image data is input from the ASIC 28 every 1/30 seconds, and the photographed time information of the input image data and the JPEG data based on the input image data are stored in the packet header buffer area 42*f* and the packet data buffer area 42*g*, respectively.

Succeedingly, referring to FIG. 8 and FIG. 9, a description is made on the file creation task. In a step S41 in FIG. 8, it is determined whether or not 1 field or 1 frame of the JPEG 2000 compression has been finished. If 1 field of the JPEG data is stored in the packet data buffer area 42*g* in the field mode or if 1 frame of the JPEG data is stored in the packet data buffer area 42*g* in the frame mode, "YES" is determined in the step S41.

The variable RECMODE is identified in a step S43. If the variable RECMODE is "1" or "3", the process proceeds from the step S43 to a step S45, and if the variable RECMODE is "2", the process proceeds from the step S43 to a step S55. That is, if the current recording mode is the normal recording mode or the additional alarm recording mode, the processes from the steps S45 to S53 are executed, and if the current recording mode is the post-alarm recording mode, the processes from steps S55 to S61 are executed.

The variable NBUFCT is identified in the step S45. If NBUFCT<2, the variable NBUFCT is incremented in the step S49 and then, the process proceeds to the step S51 while if NBUFCT=2, the variable NBUFCT is set to "0" in the step S47 and then, the process proceeds to the step S51. It is determined whether or not the divided area corresponding to the variable NBUFCT is being subjected to reading in the step S51. If the divided area is being subjected to the reading, the process is returned from the step S51 to the step S45. Thus, the divided area to be noted is circularly renewed among 420h-422h.

On the other hand, if the divided area corresponding to the variable NBUFCT is not subjected to the reading, the process proceeds from the step S51 to the step S53. In the step S53, the photographed time information and the JPEG data related with each other are read from the packet header buffer area 42f and the packet data buffer area 42g, respectively, and the still image file including the photographed time information and JPEG data read is written to the divided area corresponding to the variable NBUFCT. Herein, the reading of the photographed time information and the JPEG data and writing of the still image file are performed through the memory control circuit 40.

If the current recording mode is a post-alarm recording mode, the process proceeds from the step S43 to the step S55 so as to create the still image file at an address specified by the variable ALMWARD and the subsequent. That is, as with much of the step S53, the photographed time information and the JPEG data related with each other are read from the packet header buffer area 42f and the packet data buffer area 42g, respectively, and the still image file including the photographed time information and the JPEG data which are read is written to the address ALMWARD of the alarm storage area 42i shown in FIG. 3 and the subsequent.

In a step S57, a size of the still image file created in the step S55 is detected and the detected file size is added to the current variable ALMWARD. It is determined whether or not the alarm storage area 42i becomes full on the basis of the variable ALMWARD in a step S59. If "NO" herein, the process is returned to the step S41 while if "YES", the process proceeds to a step S61. In the step S61, the variable RECMODE is set to "3", a variable ADDCT is set to a user setting value, the variable ALM_FLAG is set to "1", and the variable ALMWARD is set to the head address of the alarm storage area 42i.

The variable RECMODE is renewed to "3" and whereby, the recording mode is renewed from the post-alarm recording mode to the additional alarm recording mode. Furthermore, the variable ALM_FLAG is renewed to "1", and whereby, it can be recognized that the alarm storage area 42i is full. In addition, the variable ALMWARD is set to the head address of the alarm storage area 42i, and whereby, the still image file to be created in the next post-alarm recording mode is written from the head address of the alarm storage area 42i.

The variable ADDCT is a variable indicative of a period during which an additional recording is performed, and the user setting value is a numerical value corresponding to a period selected by the user in the "1 second" to "300 seconds" range. By the process in the step S61, such the user setting value is set in the variable ADDCT.

After completion of the process in the step S53 or the step S61, the variable RECMODE is identified in a step S63. If RECMODE=3, the variable ADDCT is decremented in a step S65, and the current variable ADDCT is compared to "0" in a step S67. If the variable ADDCT is more than "0", the process directly returns to the step S41 while if the variable ADDCT is equal to "0", the variable RECMODE is set to "1" in a step S69 and then, the process returns to the step S41. Accordingly, after a lapse of a period corresponding to the user setting value from the start of the additional recording, the recording mode is renewed from the additional alarm recording mode to the normal recording mode.

If RECMMODE=1 is determined in the step S63, a state of the variable ALM_FLAG is identified in a step S71. Herein, if the variable ALM_FLAG is "1", it is considered that the alarm storage area 42i is full, and the process directly returns to the step S41. On the other hand, if the variable ALM_FLAG is "0", it is considered that the alarm storage area 42i is empty, and it is determined whether or not the sensor 48 generates an alarm in a step S73. If no alarm is generated herein, the process directly returns to the step S41 while if the alarm occurs, the variable RECMODE is set to "2" and then, the process returns to the step S41. Accordingly, if the alarm occurs in a state the alarm storage area 42i is empty, the recording mode is renewed from the normal recording mode to the post-alarm recording mode.

Referring to FIG. 10 and FIG. 11, a description is made on the transmission task. First, a variable ALMRADR is set to the head address of the alarm storage area 42i in a step S81 in FIG. 10. The variable ALMRADR is a variable for determining which still image file is to be read from the alarm storage area 42i in the alarm recording mode. By the process in the step S81, a head still image file is regarded as a reading file.

It is determined whether or not the file transmission cycle has elapsed in step S83. As to the normal recording mode, the file transmission cycle is arbitrarily selectable in the "1/30 seconds" to "10 seconds" range. On the other hand, as to the post-alarm recording mode or the additional alarm recording mode, the file transmission cycle is fixed to "1/30 seconds". In the step S83, it is determined whether or not such the file transmission cycle has elapsed.

When the file transmission cycle has elapsed, the variable RECMODE is identified in a step S89. If the variable RECMODE is "1" or "3", the process proceeds to a step S91, and the still image file stored in the divided area corresponding to the variable NBUFCT is transmitted to the image accumulating server 14. That is, the still image file of the noted divided area is read through the memory control circuit 40, and the read still image file is transmitted to the image accumulating server 14 through the bus I/F 44 and the NIC 46. It is determined whether or not the transmission has been finished in a step S93, and if "YES" is determined, the process returns to the step S83.

If RECMODE=2 is determined in the step S89, the process proceeds to a step S95. In this step, access is performed on the alarm storage area 42i through the memory control circuit 40, and the still image file exists at the address indicated by the variable ALMRADR and the subsequent is read. Then, the read still image file is transmitted to the image accumulating server 14 through the bus I/F 44 and the NIC 46.

It is determined whether or not the transmission of the still image file is completed in a step S97, and if "YES" is determined, the process proceeds to a step S99. In the step S99, a size of the transmitted still image file is detected, and the detected size is added to the variable ALMRADR. Thus, a reading start address of the still image file to be transmitted at the next time is specified.

It is determined whether or not the still image file remains in the alarm storage area 42i in a step S101. If "YES" herein, the process directly returns to the step S83 while if "NO", the process returns to the step S83 through a process in a step S103. In the step S103, the variable ALM_FLAG is set to "0", and the variable ALMRADR is set to the head address of the alarm storage area 42i. Thus, a preparation for a next post-alarm recording is made.

If "NO" is determined in the step S83, states of the variables ALRM_FLAG and RECMODE are identified in steps S85 and S87, respectively. If the variable ALRM_FLAG is "0", or if the variable RECMODE is "2" or "3" even though the variable ALRM_FLAG is "1", the process is returned from the step S85 or S87 to the step S83. Accordingly, if the still image file which has not been transferred yet does not exist in the alarm storage area 42i, or if the current recording mode is the post-alarm recording mode or the additional alarm recording mode even though the still image file which has not been transferred yet exists in the alarm storage area 42i, no image file transmission is performed at the intervals of file transmission operations.

On the other hand, if both of the variables ALRM_FLAG and RECMODE are "1", the process proceeds from the step S87 to the step S95. That is, if the still image file which has not been transferred yet exists in the alarm storage area 42i and the current recording mode is the normal recording mode, the processes from the step S95 to the step S103 are executed at the intervals of the file transmission operations. Thus, the still image file which has not been transferred yet in the alarm storage area 42i is transmitted to the image accumulating server 14.

As understood from the above description, the still image file of each of the objects repeatedly photographed by the image sensor 22 is transmitted to the image accumulating server 14 through the Internet 16. When the alarm occurs from the sensor 48, the post-alarm recording is started, and a plurality of still image files are written in the alarm storage area 42i. The still image files in the alarm storage area 42i are transmitted to the image accumulating server 14 during the post alarm recording period which is a period from occurrence of the alarm to the full of the alarm storage area 42i. Furthermore, the still image files created during the normal recording period are intermittently transmitted to the image accumulating server 14 at an arbitrary file transmission cycle. The still image files which have not been transmitted yet out of the still image files in the alarm storage area 42i are transmitted to the image accumulating server 14 at intervals of the file transmission operations in the normal recording mode.

That is, the still image files accumulated in the alarm storage area 42i are transmitted during the post alarm recording period and also transmitted during the normal recording period after a lapse of the additional alarm recording period. Thus, all the still image data in the alarm storage area 42i are surely transmitted to the image accumulating server 14, and the image accumulating server 14 can accumulate all the still image files created by the post-alarm recording. Furthermore, the still image file is imbedded with the photographed time information, and therefore, even if the photographed order of the objects and a transmission order of the still image files do not accord with each other, the image accumulating server 14 can adequately manage the still image files.

It is noted although the recording mode is shifted from the normal recording to the post-alarm recording in response to the occurrence of the alarm in the embodiment, the pre-alarm recording can be made between the normal recording and the post-alarm recording.

In this case, it is necessary that a storing destination of the still image file is integrated to the alarm storage area, a part of the alarm storage area (first area) is assigned for the normal recording, the pre-alarm recording and the additional alarm recording, and the other part of the alarm storage area (second area) is assigned for the post-alarm recording. In addition, it is necessary that the still image files created during the normal recording period are transmitted at an arbitrary transmission cycle, the still image files created during the pre-alarm recording period and a part of the still image files created during the post-alarm recording period are transmitted every 1/30 seconds, and the rest of the still image files created in the post-alarm recording are transmitted during the normal recording period after the additional alarm recording period.

It is noted that a period previous to a predetermined period prior to the occurrence of the alarm is a "normal recording period", and the predetermined period prior to the occurrence to the alarm is a "pre-alarm recording period".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmitting apparatus which transmits still image data of an object repeatedly photographed by an imager to an image management apparatus through a communication network, comprising:
   a first writer for writing a plurality of screens of the still image data to a first memory area when an alarm occurs;
   a first transmitter for transmitting the still image data stored in said first memory area to said image management apparatus during a first period which is a period from occurrence of the alarm to completion of writing of the plurality of screens of the still image data;
   a second transmitter for transmitting to said image management apparatus still image data obtained during a second period different from the first period at an arbitrary cycle; and
   a third transmitter for transmitting to said image management apparatus the still image data which has not been transmitted yet by said first transmitter at intervals of transmission operations by said second transmitter.

2. A data transmitting apparatus according to claim 1, further comprising an assigner for assigning photographed time information to the still image data prior to transmitting to said image management apparatus.

3. A data transmitting apparatus according to claim 1, further comprising a second writer for writing the still image data to a second memory area, wherein said second transmitter transmits the still image data stored in said second memory area at the arbitrary cycle.

4. A data transmitting apparatus according to claim 3, further comprising a forth transmitter for transmitting the still image data stored in said second memory area to said image management apparatus at a predetermined target cycle during a third period sandwiched between the first period and the second period.

5. A data transmitting apparatus according to claim 4, wherein said third period is variable.

6. A video camera provided with a data transmitting apparatus according to any one of claims 1 to 5.

7. A data transmitting method which transmits still image data of an object repeatedly photographed by an imager to an image management apparatus through a communication network, comprising steps of:
(a) writing a plurality of screens of the still image data to a first memory area when an alarm occurs;
(b) transmitting the still image data stored in said first memory area to said image management apparatus during a first period which is a period from occurrence of the alarm to completion of writing of the plurality of screens of the still image data;
(c) transmitting to said image management apparatus still image data obtained during a second period different from the first period at an arbitrary cycle; and
(d) transmitting to said image management apparatus the still image data which has not been transmitted yet by said step (b) at intervals of transmission operations by said step (c).

* * * * *